(12) United States Patent
Shanmugam et al.

(10) Patent No.: US 11,356,390 B1
(45) Date of Patent: Jun. 7, 2022

(54) MULTI-DIMENSIONAL/MULTI-ACTOR CONVERSATIONAL BOT

(71) Applicant: Bank of America Corporation, Charlotte, NC (US)

(72) Inventors: Maruthi Z. Shanmugam, Plano, TX (US); Nishant H. Shah, Indian Land, SC (US); Sushil Golani, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/212,059

(22) Filed: Mar. 25, 2021

(51) Int. Cl.
| H04L 51/02 | (2022.01) |
| G06Q 30/02 | (2012.01) |
| G06Q 30/00 | (2012.01) |
| G06F 40/35 | (2020.01) |
| G06N 5/04 | (2006.01) |

(52) U.S. Cl.
CPC .............. *H04L 51/02* (2013.01); *G06F 40/35* (2020.01); *G06N 5/04* (2013.01); *G06Q 30/016* (2013.01); *G06Q 30/0202* (2013.01)

(58) Field of Classification Search
None
See application file for complete search history.

(56) References Cited

U.S. PATENT DOCUMENTS

| 10,152,718 | B1* | 12/2018 | Janefalkar | G06F 21/629 |
| 10,692,006 | B1* | 6/2020 | Zhang | G06N 3/08 |
| 10,956,255 | B1* | 3/2021 | Al-Bahar | G06Q 10/20 |
| 11,206,227 | B2* | 12/2021 | Akkiraju | H04L 51/02 |
| 11,228,683 | B2* | 1/2022 | Wang | H04M 3/5175 |
| 11,282,005 | B2* | 3/2022 | Kozloski | G06N 7/005 |
| 2012/0166345 | A1* | 6/2012 | Klemm | G06Q 30/016 705/304 |
| 2013/0198039 | A1* | 8/2013 | Sridharan | G06Q 30/016 705/26.44 |
| 2014/0164256 | A1* | 6/2014 | Booij | H04M 3/5231 705/304 |
| 2014/0164257 | A1* | 6/2014 | Brown | G06Q 30/016 705/304 |
| 2014/0245143 | A1* | 8/2014 | Saint-Marc | G06F 3/0484 715/716 |
| 2015/0324900 | A1* | 11/2015 | Starikova | G06F 3/04842 705/35 |
| 2017/0003856 | A1* | 1/2017 | Mande | G06Q 10/20 |
| 2017/0017964 | A1* | 1/2017 | Janefalkar | G06F 21/31 |

(Continued)

*Primary Examiner* — Backhean Tiv
(74) *Attorney, Agent, or Firm* — Weiss & Arons LLP

(57) ABSTRACT

A method for encouraging dialogue between, and promoting transparency of said dialogue, a plurality of telecommunicators is provided. The plurality of telecommunicators may include an end user and an agent. The method includes receiving a request for a dialogue from the end user. The request includes a set of end user log-in credentials associated with the end user. The method further includes identifying the agent associated with a set of agent log-in credentials. The agent may respond to the request. The method also distinguishes the end user from the agent based on the set of end user log-in credentials and the set of agent log-in credentials and then instantiates an instance of telecommunications between the end user and the agent based, at least in part, on the distinguishing. Finally, the method includes monitoring the instantiation.

20 Claims, 8 Drawing Sheets

(56) References Cited

U.S. PATENT DOCUMENTS

| | | | |
|---|---|---|---|
| 2017/0140322 A1* | 5/2017 | Kozloski | G06N 5/043 |
| 2017/0310613 A1* | 10/2017 | Lalji | G06F 40/30 |
| 2018/0341396 A1* | 11/2018 | Yaseen | G06F 16/90332 |
| 2019/0012390 A1* | 1/2019 | Nishant | G06N 3/006 |
| 2019/0058793 A1* | 2/2019 | Konig | H04M 3/5183 |
| 2019/0109803 A1* | 4/2019 | Akkiraju | G09B 5/02 |
| 2019/0182382 A1* | 6/2019 | Mazza | H04L 51/02 |
| 2019/0303218 A1* | 10/2019 | Kantor | G06F 9/485 |
| 2020/0105257 A1* | 4/2020 | Kwatra | G10L 25/24 |
| 2020/0151648 A1* | 5/2020 | Gorny | G06Q 30/016 |
| 2020/0403944 A1* | 12/2020 | Joshi | H04L 41/5051 |
| 2021/0176361 A1* | 6/2021 | Wang | H04M 3/5166 |
| 2021/0201238 A1* | 7/2021 | Sekar | G06Q 10/00 |
| 2021/0201359 A1* | 7/2021 | Sekar | G06Q 30/0244 |
| 2021/0360106 A1* | 11/2021 | Matula | H04M 3/5166 |
| 2022/0012673 A1* | 1/2022 | O'Carroll | G06Q 10/107 |
| 2022/0067746 A1* | 3/2022 | Thakkar | G06Q 30/012 |
| 2022/0086280 A1* | 3/2022 | Godavarthy | H04M 3/2218 |

* cited by examiner

US 11,356,390 B1

MULTI-DIMENSIONAL/MULTI-ACTOR CONVERSATIONAL BOT

FIELD OF TECHNOLOGY

Aspects of the disclosure relate to telecommunications. More particularly, this disclosure relates to systems and processes for increasing transparency and promoting dialogue between telecommunicators.

BACKGROUND OF THE DISCLOSURE

Bots, otherwise known as virtual assistants, are virtual and/or hardware devices used to provide various functions. Certain bots have been leveraged to promote communication during electronic communication sessions such as teleconferences.

Certain bots have been leveraged to send messages to one or more participants of a teleconference. Such messaging may include providing messaging to individual telecommunicators. At times, this messaging is provided to individual telecommunicators transparent to other participating telecommunicators.

One issue that arises during bot-assisted teleconferences is that the bot(s) monitor the teleconference in order to provide accurate functioning during same.

This functioning requires accurate electronic record-keeping of the identity of the participants and real-time responsiveness to conversation utterances.

It is an object of the disclosure to provide systems and methods that enable accurate, high-speed, electronic record-keeping of the participants and real-time responsiveness to conversation utterances.

It is a further object of the disclosure to provide real-time messaging in response to monitored conversation utterances.

SUMMARY OF THE DISCLOSURE

An article of manufacture including a non-transitory computer usable medium having computer readable program code embodied therein, is provided. The code, when executed by one or more processors, preferably configures a computer to execute a method for encouraging dialogue between, and promoting transparency of said dialogue, between a plurality of telecommunicators. The plurality of telecommunicators include an end user and an agent.

The computing device may be configured to receive a request, from the end user, for a dialogue. The request may include a set of end user log-in credentials associated with the end user. The request may or may not identify the agent. The agent may be associated with a set of agent log-in credentials. The agent may be tasked with responding to the request.

The computing device may be configured to distinguish the end user from the agent based on the set of agent log-in credentials of the end user and the set of end user log-in credentials. The distinguishing may include forming a delta set—i.e., a set of criteria that differentiate between the set of agent log-in credentials of the end user and the set of end user log-in credentials.

The computing device may also be configured to instantiate an instance of telecommunications between the end user and the agent. The instance of telecommunications between the end user and the agent may be based, at least in part, on the delta set between the set of agent log-in credentials of the end user and the set of end user log-in credentials. In addition, the computing device may be configured to monitor the instance of telecommunications.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
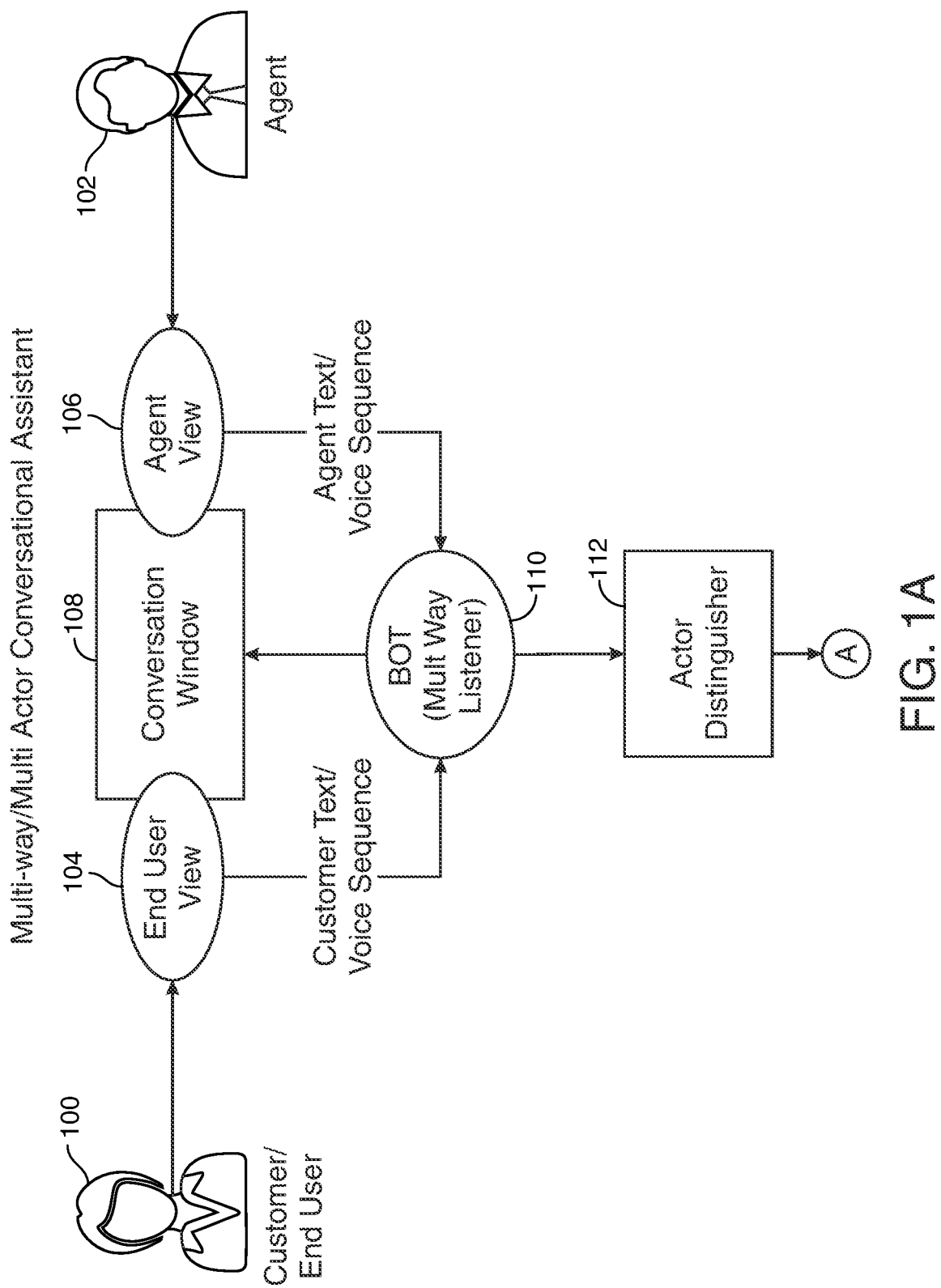
FIG. 1A shows a first illustrative flow diagram according to the principles of the disclosure.

Certain embodiments of a multi-dimensional/multi-actor conversational bot are provided. Such a bot, according to the disclosure set forth herein, may preferably listen and monitor more than one participant.

Such a bot may also transform the dialogue in an electronic conversation. For example, such a bot may improve transparency between multiple actors. In one such embodiment, legacy bots have been used to offer various potential statements and/or responses to teleconference participants. These potential statements and/or responses have typically been offered, to a selected participant, in groups so a participant has the ability to choose from among the offered potential statements and/or responses.

In certain embodiments, according to the disclosure such potential statements and/or responses may be offered to one or more of the participants, but also be shown to a second participant. In this way, the system may share its advice to one participant with other interested participants. Such a system may promote collaboration and participation among and between the various participations in a way that advances the conversation among the participants.

Such bots may invoke a conversation window. The conversation window can be conducted through various channels. For example, a channel can be a mobile device such as a mobile phone, a chat window or through some other electronic communications medium.

In certain embodiments, a bot according to the embodiments may determine the identity of, and/or differentiate between the actors. The bot may make these determinations and/or differentiations based on the authentication and system routing mechanism that links the various participants.

Some embodiments of the bot may listen to all participants, such as for example a customer and an agent. The bot may then be configured to proactively help the agent to answer. In certain embodiments, the bot/agent dialogue may be exposed to the customer. This double exposure—i.e., bot-agent and bot-consumer exposure—may make the customer more comfortable with the bot-agent interaction (which the consumer may or may not be aware of) as well as the telecommunication as a whole. In legacy systems, certain bots may only have interacted with the agent, thereby causing the consumer to experience a "left-out" sentiment. Such an increase in transparency of the bot-agent interaction increases customer satisfaction with the experience.

Some embodiments may provide customer live sentiment scores to agents based on a sentiment model. These live sentiment scores may help the agent to have a more empathetic conversation. These live sentiment scores may be based on the customer query time and various other factors. Systems and methods for determining sentiment according to the disclosure are disclosed in U.S. patent application Ser. No. 16/856,144, entitled, "CUSTOMER SENTIMENT DRIVEN WORKFLOW, SAID WORKFLOW THAT ROUTES SUPPORT REQUESTS BASED ON SENTIMENT IN COMBINATION WITH VOICE-DERIVED DATA", filed on Apr. 23, 2020, which is hereby incorporated by reference herein in its entirety.

Certain factors of sentiment may be relevant for use in determining the sentiment of a user or an agent in the current context. These factors include 1) Query time such as length of the call; 2) Choice of words; 3) Machine-learning determined implication of utterances 4) Machine-learning, predetermined, high angst issues; 5) tone.

In certain embodiments, a resolution marker may be invoked. A resolution marker may auto-escalate a certain communication to a supervisor. In certain embodiments, a resolution marker may provide one or more solution options to the supervisor.

In some embodiments, participants of the telecommunication may be monitored. For example, certain embodiments may monitor the sentiment of the one or more participants of the telecommunication. In one use case, an agent and/or a customer can be evaluated for any suitable metric or characteristic associated with the telecommunication.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1A shows an exemplary diagram of a multi-way/multi-actor conversational assistant. This exemplary diagram also shows a customer/end user 100 and an agent 102 as exemplary participants in a telecommunication according to the disclosure.

FIG. 1A shows further an end user view 104 corresponding to a user interface associated with customer/end user 100. FIG. 1A also shows an agent view 106 corresponding to a user interface associated with agent 102.

Both customer/end user 100 and end user view 104 are preferably electronically coupled to form a conversation window 108. Conversation window 108 may include a continuous electronic platform for supporting the telecommunications between customer/end user 100 and end user view 104 and agent 102 and agent view 106.

Conversation window 108 may be actively monitored by BOT 110 (multi-way listener). As part of the monitoring, BOT 110 may leverage actor distinguisher 112 to distinguish between the participants. In one embodiment according to the disclosure, each of customer/end user 100 and end user view 104 may preferably log in to conversation window 108 using log-in credentials. Agent 102 and agent view 106 may preferably log in to conversation window 108 using login credentials.

Actor distinguisher 112 may form a combination hardware/software device that assigns, in one embodiment, an identity to each of the participants. Actor distinguisher 112 may use log-in credentials for each of the participants to form and track their respective identities.

In some embodiments, actor distinguisher 112 may use, in combination with log-in credentials or separately therefrom, the communication channel—e.g., landline, mobile phone, tablet, etc.—through which the participant communicated to form and/or track their respective identities.

Thereafter, actor distinguisher 112 may track the activity of each participant during the telecommunication. The tracking may leverage real-time voice recognition devices and/or real-time text recognition devices, or other suitable devices, to track the participant utterances.

Such log-in credentials may include usernames, passwords, SSO (single-sign-on) IDs or any other suitable sign-on credentials.

Figure 1B:
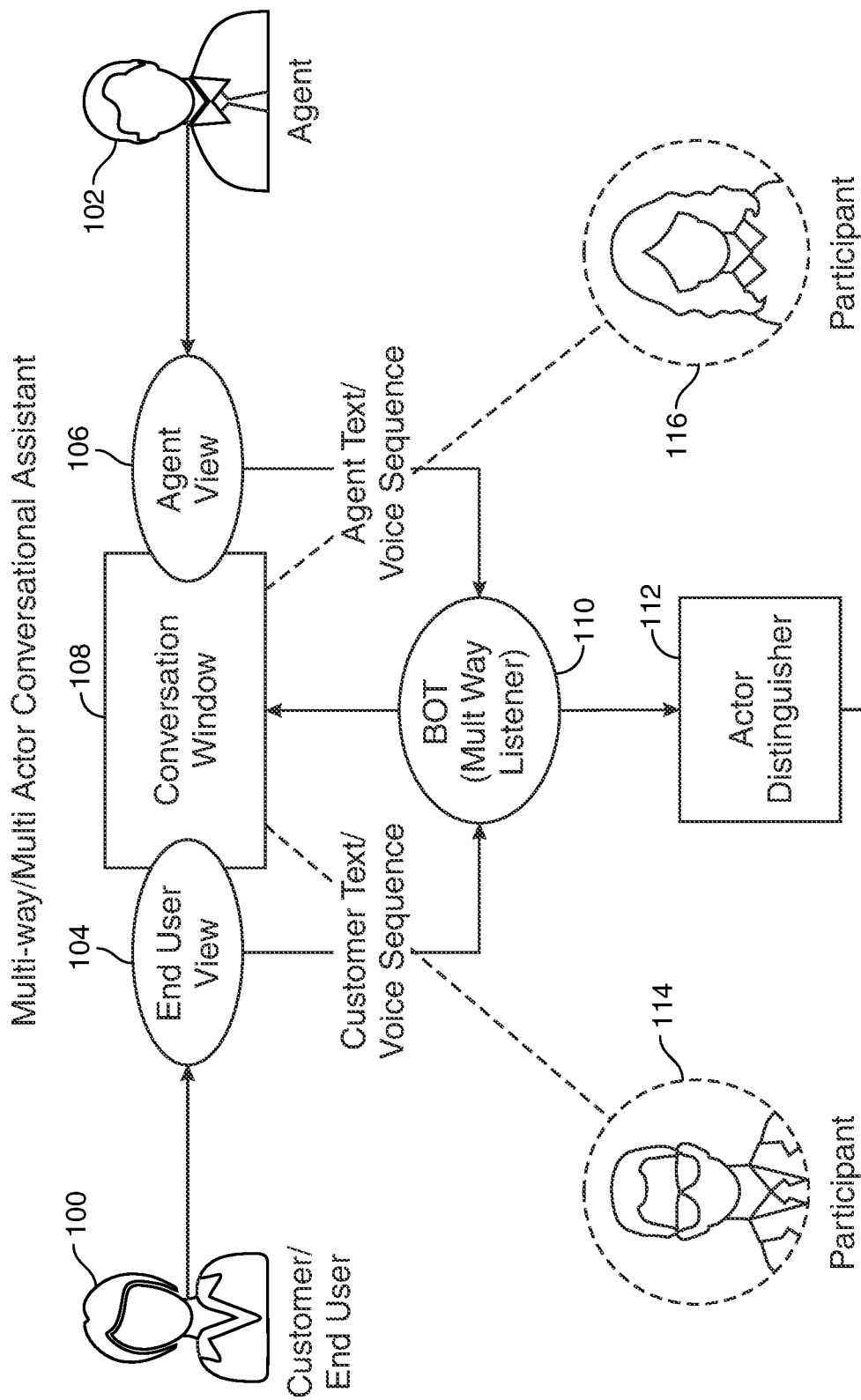
FIG. 1B shows a second illustrative flow diagram according to the principles of the disclosure.

FIG. 1B shows all the elements shown in FIG. 1A. In addition, FIG. 1B shows participants 114 and 116. It should be noted that the role played by a device, such as a processor involved with the hardware/software described above, that serves as actor distinguisher 112 in FIG. 1B may increase exponentially in terms of monitoring, analyzing, and overall bandwidth usage over the role played by a device that serves as actor distinguisher 112 in FIG. 1A. This is primarily attributable to the additional interactions that occur between participants that exist in the exemplary four participants in FIG. 1B instead of the single relationship that exists between two participants in FIG. 1A.

Figure 2:
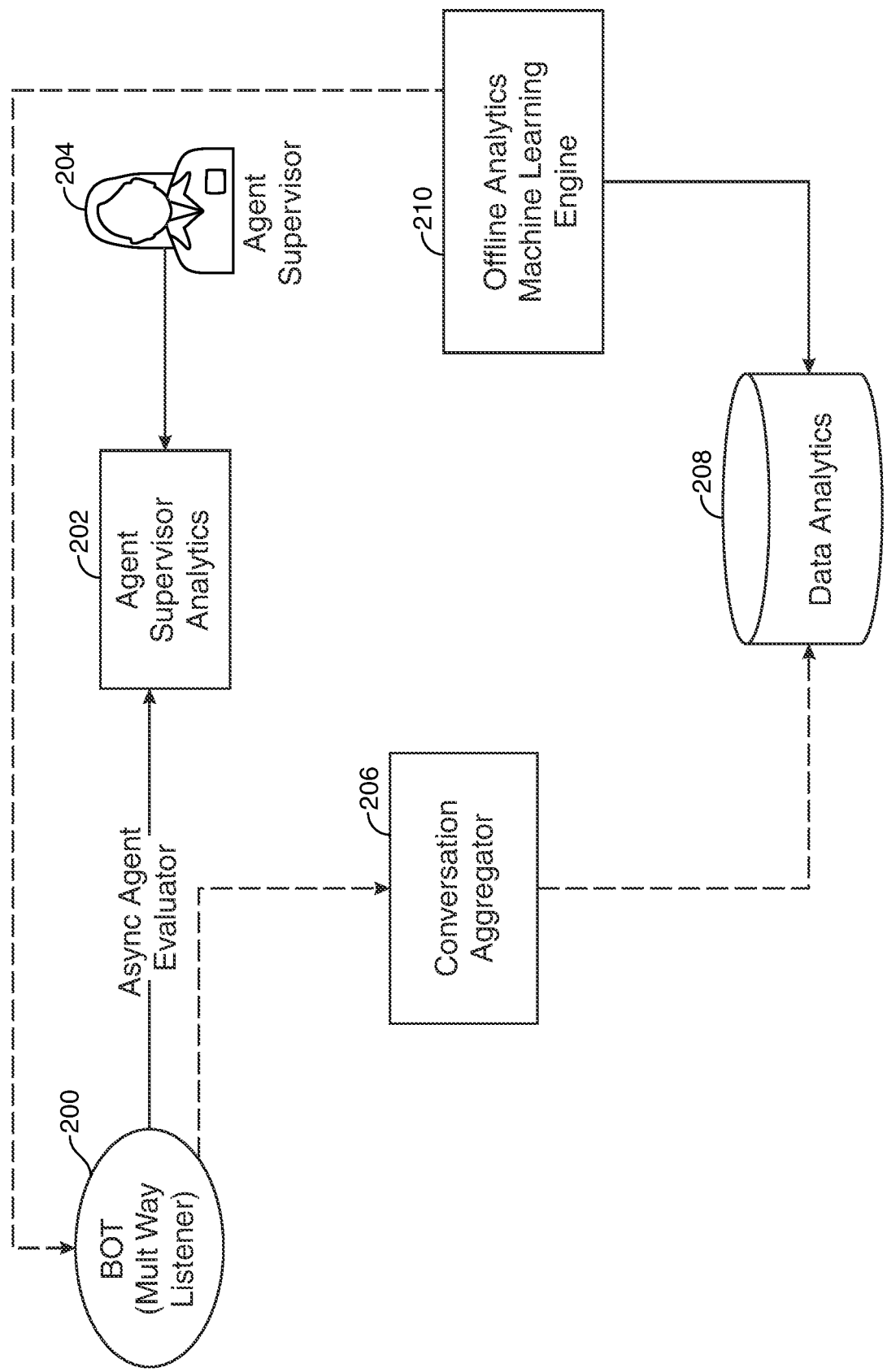
FIG. 2 shows a third illustrative flow diagram according to the principles of the disclosure.

Some of the analytics involved in FIGS. 1A-1B are set forth in FIG. 2. FIG. 2 Shows BOT 200 (similar to, or even identical with, exemplary BOT 110 in FIGS. 1A-1B). In certain embodiments, BOT 200 may preferably provide asynchronous agent (or other relevant participant) evaluation. The agent evaluation may be downloaded, or made otherwise available, for review by an agent supervisor analytics 202 module. Such a module may enable evaluating the agent's sentiment, evaluating the agent's sentiment vis-à-vis the end user's sentiment, evaluating the agent's sentiment over time, evaluating the agent's sentiment vis-à-vis past agent performance, or any other suitable, preferably real-time, evaluation.

Where such evaluation requires, agent supervisor analytics 202 module may be configured to provide a real-time communication to agent supervisor 204. Such communication may preferably enable agent supervisor 204 to participate in the communication—at times as an additional participant as shown at FIG. 1B—or to take over the communication from agent 102.

In another aspect of analytics shown in FIG. 2, BOT 200 may be in electronic communication with conversation aggregator 206. Conversation aggregator 206 may, in certain embodiments, package the contents of one or more utterances made during the communication. Conversation aggregator 206 may, in certain embodiments, package the contents of one or more communications.

Following packaging of the communications, the packaged communications may be submitted to data analytics at 208. In some embodiments, data analytics 208 may, following performance of relevant analytics on the aggregated data, forward the results of the relevant analytics to offline analytics machine learning engine 210.

Following processing and storage of the data analytics 208 by offline analytics machine learning engine 210, the results of same may be leveraged to inform BOT 200 in a way that can improve the performance of BOT 200 in future telecommunications.

Figure 3:
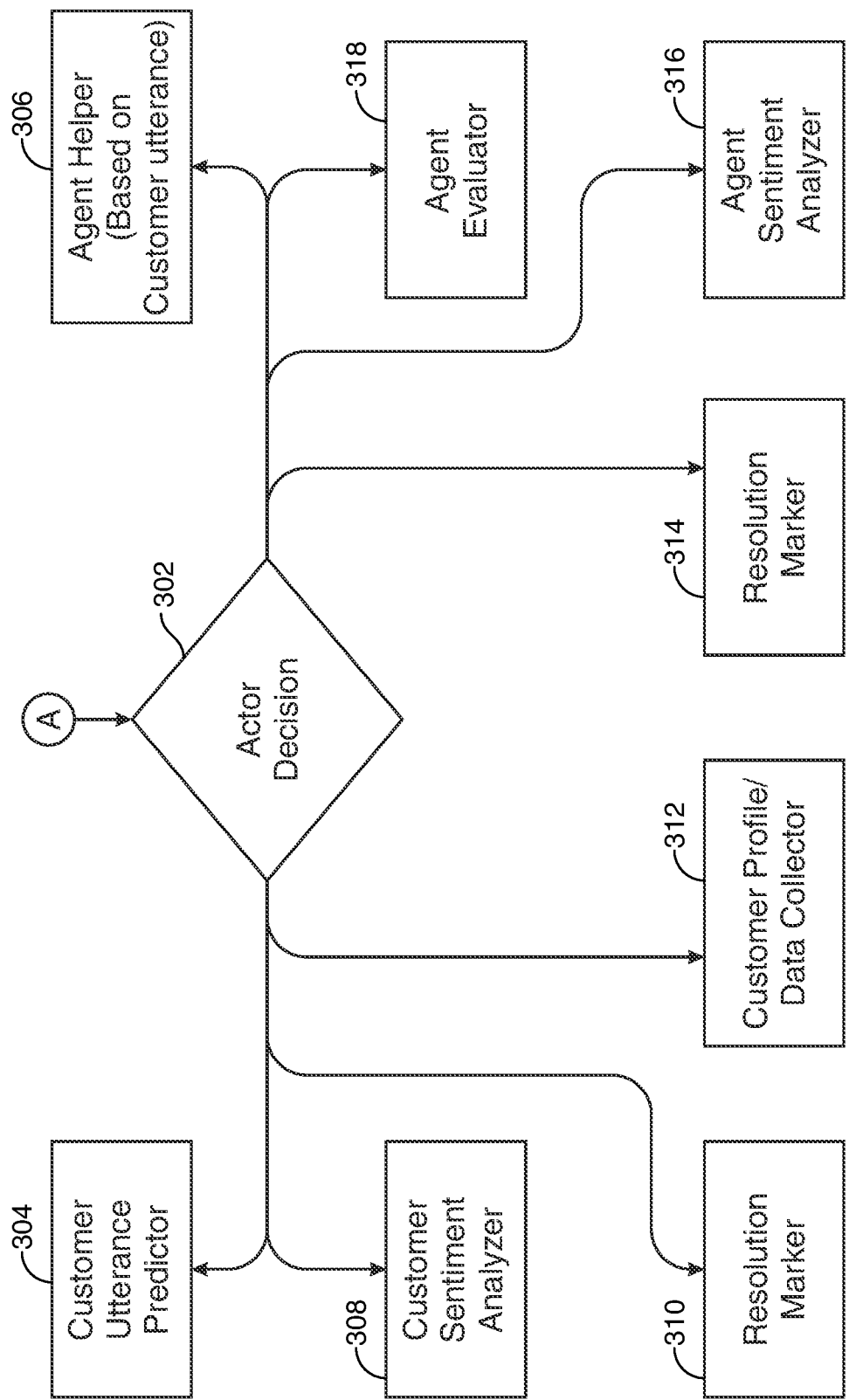
FIG. 3 shows a fourth illustrative flow diagram according to the principles of the disclosure.

FIG. 3 shows further branches of an illustrative flow diagram according to the disclosure. An actor decision 302 is shown. Actor decision 302 preferably sets forth a query to determine what, if any, action should preferably be taken in response to actions, and/or utterances, monitored during the ongoing telecommunication.

For example, actor decision 302 may invoke a customer utterance predictor 304. As such—actor decision 302 attempts to predict the future customer utterances in the telecommunications, and formulate potential responses to same.

This prediction may be based on past customer telecommunication history.

In some embodiments, this prediction may be based on present (or past or trending) customer sentiment. For example, customer sentiment analyzer 308 may be invoked to determine customer sentiment. Customer sentiment analyzer 308 may preferably provide to actor decision 302 an indication of the current customer sentiment. Actor decision 302 may then use the information provided both by customer utterance prediction 304 and/or customer sentiment analyzer 308 to formulate a course of action. Thereafter, actor decision 302 may be provided to the agent, or other suitable participant, to help the agent formulate a course of conduct, response and/or approach to the telecommunication.

In some circumstances, such as those described above with respect to agent supervisor analytics 202 and agent supervisor 204, the system may be configured to auto-evaluate certain circumstances, based on information from customer utterance predictor 304 and customer sentiment analyzer 308, for real-time referral to an agent supervisor 202.

In certain embodiments, actor decision 302 may be in communication with agent helper 306. Agent helper 306 may be a mechanism which is in contact with actor decision 302. Agent helper 306 may preferably provide information, based on customer utterance information, to inform the agent/actor decisions.

In addition, the agent may itself be continually or periodically evaluated by agent evaluator 318. Part of the evaluation may include deriving the current agent sentiment, and/or the agent sentiment trend, using agent sentiment analyzer 316.

In some circumstances, such as those described above with respect to agent supervisor analytics 202 and agent supervisor 204, the system may be configured to auto-evaluate certain circumstances, based on information from agent utterance predictor 304 and agent sentiment analyzer 314, for real-time referral to an agent supervisor 202.

Figure 4:
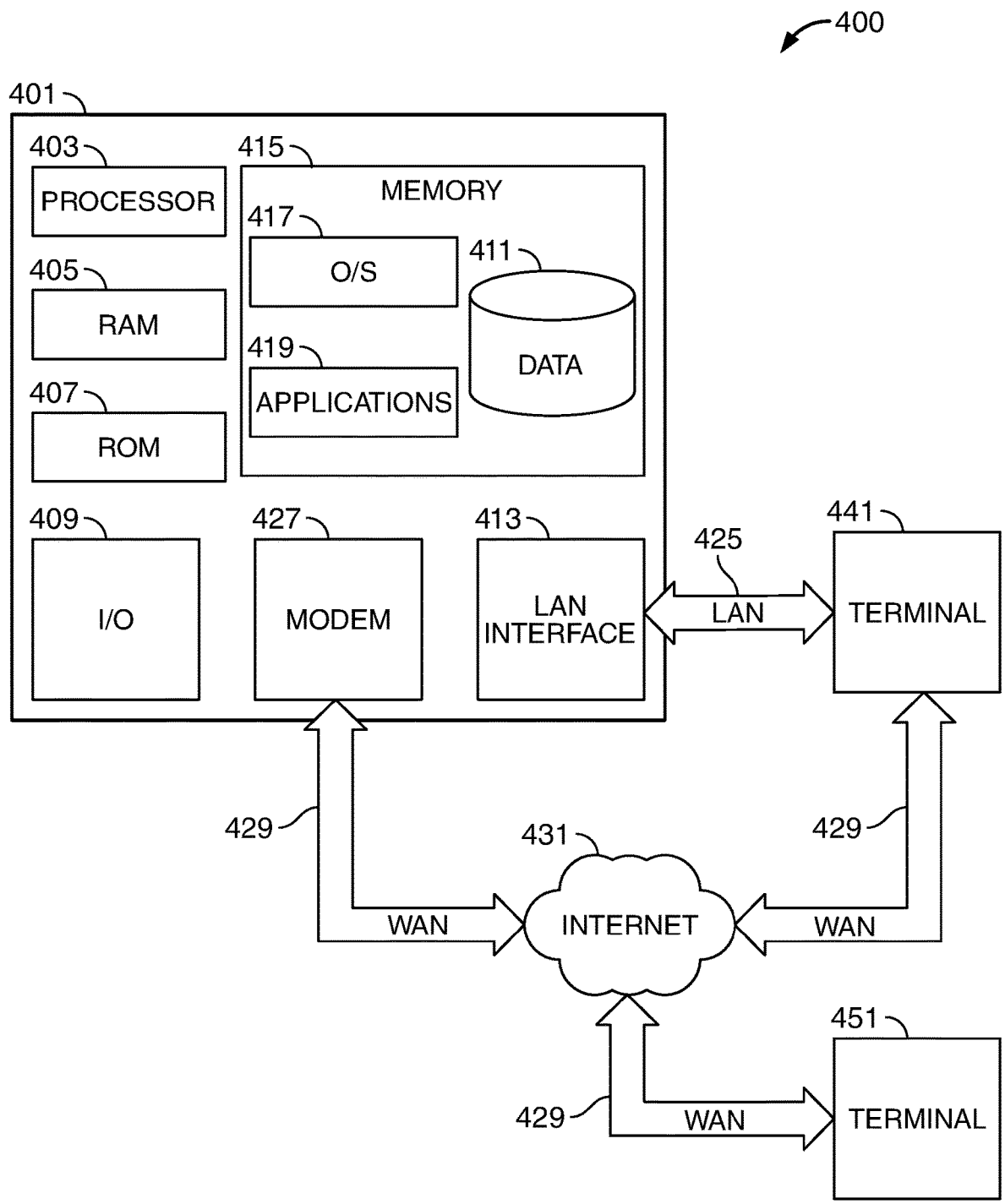
FIG. 4 shows an illustrative block diagram of system for in accordance with principles of the disclosure.

FIG. 4 shows an illustrative block diagram of system 400 that includes computer 401. Computer 401 may alternatively be referred to herein as a "server" or a "computing device." Computer 401 may be a workstation, desktop, laptop, tablet, smart phone, or any other suitable computing device. Elements of system 400, including computer 401, may be used to implement various aspects of the systems and methods disclosed herein.

Computer 401 may have a processor 403 for controlling the operation of the device and its associated components, and may include RAM 405, ROM 407, input/output module 409, and a memory 415. The processor 403 may also execute all software running on the computer—e.g., the operating system and/or voice recognition software. Other components commonly used for computers, such as EEPROM or Flash memory or any other suitable components, may also be part of the computer 401.

The memory 415 may be comprised of any suitable permanent storage technology—e.g., a hard drive. The memory 415 may store software including the operating system 417 and application(s) 419 along with any data 411 needed for the operation of the system 400. Memory 415 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 401 may execute the instructions embodied by the software to perform various functions.

Input/output ("I/O") module may include connectivity to a microphone, keyboard, touch screen, mouse, and/or stylus through which a user of computer 401 may provide input. The input may include input relating to cursor movement. The input may relate to cash verification and remote deposit. The input/output module may also include one or more speakers for providing audio output and a video display device for providing textual, audio, audiovisual, and/or graphical output. The input and output may be related to computer application functionality.

System 400 may be connected to other systems via a local area network (LAN) interface 413.

System 400 may operate in a networked environment supporting connections to one or more remote computers, such as terminals 441 and 451. Terminals 441 and 451 may be personal computers or servers that include many or all of the elements described above relative to system 400. The network connections depicted in FIG. 4 include a local area network (LAN) 425 and a wide area network (WAN) 429, but may also include other networks. When used in a LAN networking environment, computer 401 is connected to LAN 425 through a LAN interface or adapter 413. When used in a WAN networking environment, computer 401 may include a modem 427 or other means for establishing communications over WAN 429, such as Internet 431.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 419, which may be used by computer 401, may include computer executable instructions for invoking user functionality related to communication, such as e-mail, Short Message Service (SMS), and voice input and speech recognition applications. Application program(s) 419 (which may be alternatively referred to herein as "plugins," "applications," or "apps") may include computer executable instructions for invoking user functionality related performing various tasks. The various tasks may be related to monitoring electronic teleconferences.

Computer 401 and/or terminals 441 and 451 may also be devices including various other components, such as a battery, speaker, and/or antennas (not shown).

Terminal 451 and/or terminal 441 may be portable devices such as a laptop, cell phone, Blackberry™, tablet, smartphone, or any other suitable device for receiving, storing, transmitting and/or displaying relevant information. Terminals 451 and/or terminal 441 may be other devices. These devices may be identical to system 400 or different. The differences may be related to hardware components and/or software components.

Any information described above in connection with database 411, and any other suitable information, may be stored in memory 415. One or more of applications 419 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 5:
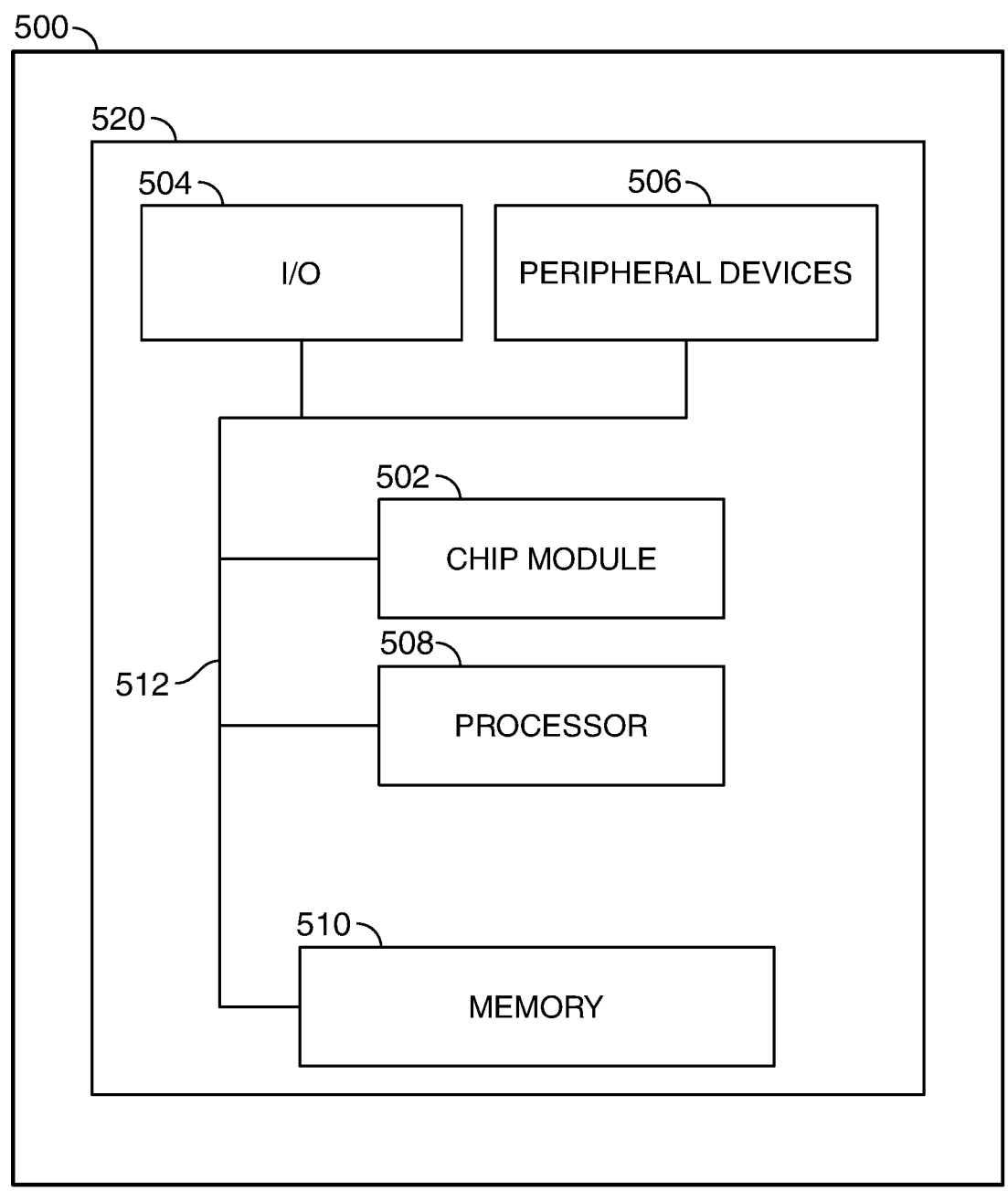
FIG. 5 shows illustrative apparatus that may be configured in accordance with the principles of the disclosure.

FIG. 5 shows illustrative apparatus 500 that may be configured in accordance with the principles of the disclosure. Apparatus 500 may be a computing machine. Apparatus 500 may include one or more features of the apparatus shown in FIG. 1. Apparatus 500 may include chip module 502, which may include one or more integrated circuits, and which may include logic configured to perform any other suitable logical operations.

Apparatus 500 may include one or more of the following components: I/O circuitry 504, which may include a transmitter device and a receiver device and may interface with fiber optic cable, coaxial cable, telephone lines, wireless devices, PHY layer hardware, a keypad/display control device or any other suitable media or devices; peripheral devices 506, which may include counter timers, real-time timers, power-on reset generators or any other suitable peripheral devices; logical processing device 508, which may compute data structural information and structural parameters of the data; and machine-readable memory 510.

Machine-readable memory 510 may be configured to store in machine-readable data structures: machine executable instructions (which may be alternatively referred to herein as "computer instructions" or "computer code"), applications, signals, and/or any other suitable information or data structures.

Components 502, 504, 506, 508 and 510 may be coupled together by a system bus or other interconnections 512 and may be present on one or more circuit boards such as 520. In some embodiments, the components may be integrated into a single chip. The chip may be silicon-based.

Figure 6:
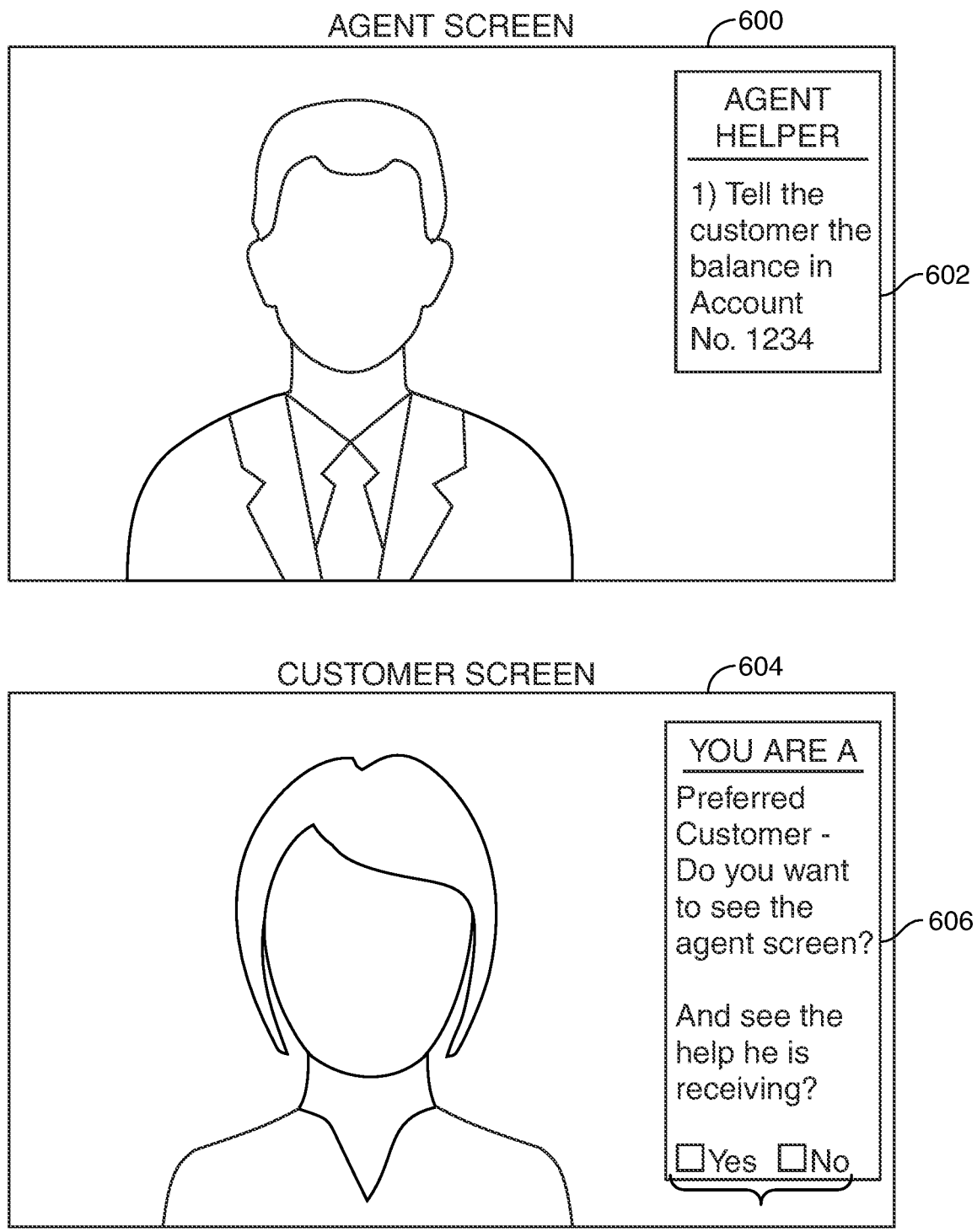
FIG. 6 shows illustrative display screens according to the disclosure.

FIG. 6 shows an illustrative display screens according to the disclosure. FIG. 6 shows an agent screen 600. Agent screen 600 includes agent helper region 602.

FIG. 6 also shows customer screen 604. Customer screen 604 also includes opt-in region 606. Opt-in region 606 may preferably include an opt-in area 608. Opt-in area 608 may preferably support selectable dialogue areas that permit the user to select to see the screen of the agent.

Figure 7:
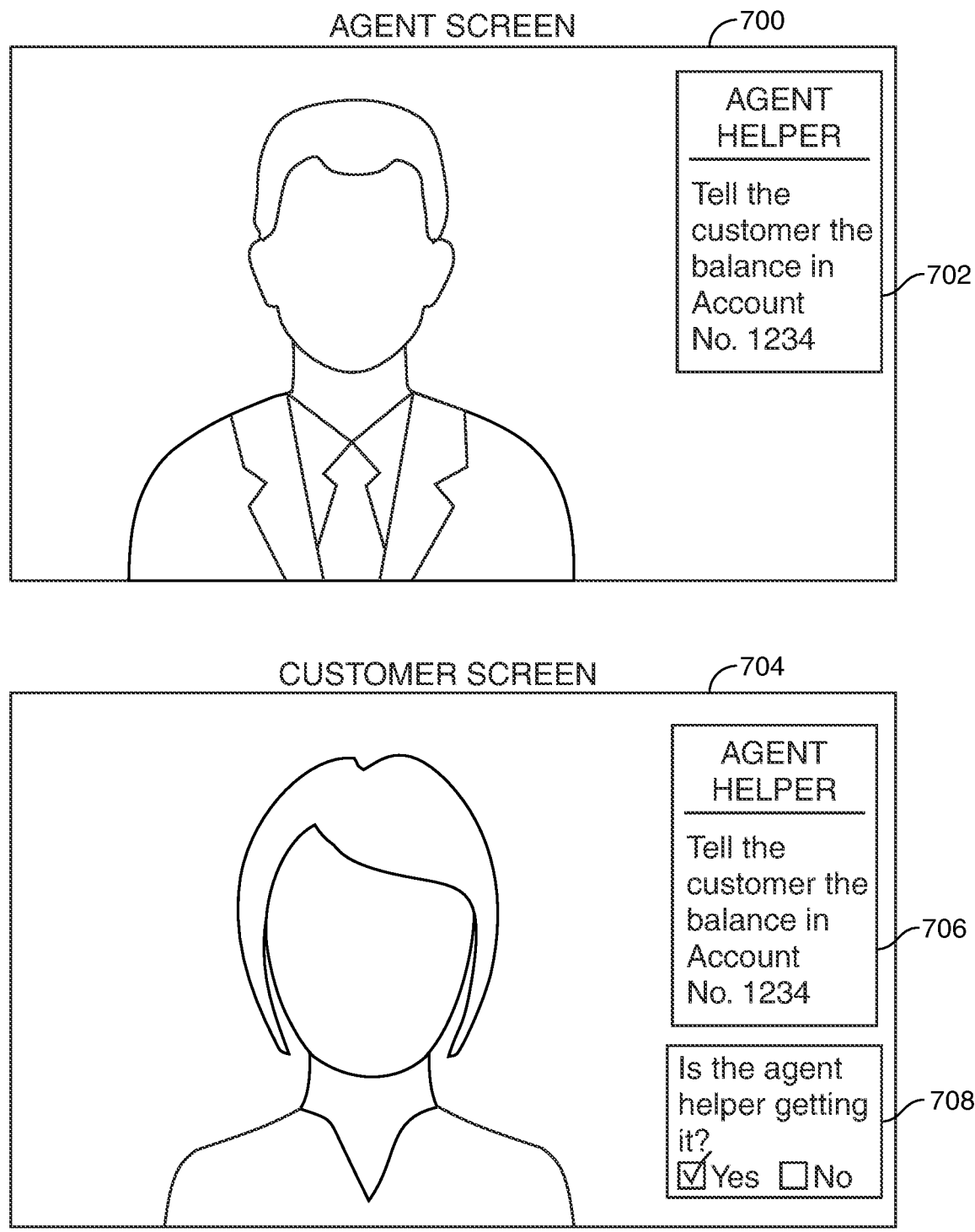
FIG. 7 shows other illustrative display screens according to the disclosure.

FIG. 7 shows another illustrative display screen according to the disclosure. Screen 700 shows again the agent helper region 702 providing a suggestion to the agent to tell the customer the account balance in account number 1234.

Customer screen 704 shows the customer screen following the customer opt-in to the preferred customer opt-in option. Selectable region 708 enables the customer to select the ability to view, at region 706, the information being shown to the agent. Thus, systems and methods according to the invention allow for more participant transparency than in legacy systems.

Thus, systems and methods directed to multi-dimensional/multi-actor conversational bot are provided. Persons skilled in the art will appreciate that the present invention can be practiced by other than the described embodiments, which are presented for purposes of illustration rather than of limitation. The present invention is limited only by the claims that follow.

What is claimed is:

1. An article of manufacture comprising a non-transitory computer usable medium having computer readable program code embodied therein, the code when executed by one or more processors configuring a computer to execute a method for encouraging dialogue between and promoting transparency of said dialogue, a plurality of telecommunicators, said plurality of telecommunicators comprising an end user and an agent, the method comprising:
   receiving a request for a dialogue from said end user, said request comprising a set of end user log-in credentials associated with the end user;
   identifying the agent, said agent associated with a set of agent log-in credentials, to respond to the request;
   distinguishing the end user from the agent based on the set of end user log-in credentials and the set of agent log-in credentials;
   instantiating an instance of telecommunications between the end user and the agent, said instantiating being based, at least in part, on the distinguishing; and
   monitoring the instantiation.

2. The method of claim 1 further comprising receiving a customer utterance, and predicting customer intent based, at least in part, on the customer utterance.

3. The method of claim 2, further comprising using the customer intent to prepare and transmit a potential reply to the agent.

4. The method of claim 1 further comprising receiving a customer utterance, and predicting customer sentiment based, at least in part, on the customer utterance.

5. The method of claim 4, further comprising predicting customer intent based, at least in part, on the customer utterance, and using the customer intent and the customer sentiment to prepare and transmit a potential reply to the agent.

6. The method of claim 1, the monitoring comprising auto-escalating the instance of telecommunications in response to detection of an anomalous agent behavior and/or an anomalous end user behavior, said auto-escalating comprising transmitting an alert regarding the instance of telecommunications, to an entity associated with the agent.

7. The method of claim 1 further comprising using a conversation aggregator to build a data analytics library, said using a conversation aggregator to build a data analytics library comprising storing a content of the instance of telecommunications for later in time reference and comparison.

8. A computing device comprising a non-transitory computer usable medium having computer readable program code embodied therein, the code when executed by one or more processors configuring a computer to execute a method for encouraging dialogue between and promoting transparency of said dialogue, a plurality of telecommunicators, said plurality of telecommunicators comprising an end user and an agent, the computing device configured to:
  receive a request for a dialogue from said end user, said request comprising a set of end user log-in credentials associated with the end user;
  identify the agent, said agent associated with a set of agent log-in credentials, to respond to the request;
  distinguish the end user from the agent based on the set of agent log-in credentials of the end user and the set of end user log-in credentials to form a delta set between the set of agent log-in credentials of the end user and the set of end user log-in credentials;
  instantiate an instance of telecommunications between the end user and the agent, said instance of telecommunications between the end user and the agent being based, at least in part, on the delta set between the set of agent log-in credentials of the end user and the set of end user log-in credentials; and
  monitor the instance of telecommunications.

9. The computing device of claim 8, said computing device being further configured to receive a customer utterance, and predict a customer intent based, at least in part, on the customer utterance.

10. The computing device of claim 9, said computing device being further configured to use the customer intent to prepare and transmit, to the agent, a potential reply to the request.

11. The computing device of claim 8, said computing device being further configured to receive a customer utterance, and predict a customer sentiment based, at least in part, on the customer utterance.

12. The computing device of claim 11, said computing device further configured to predict a customer intent based, at least in part, on the customer utterance, and to use the customer intent and the customer sentiment to prepare and transmit a potential reply to the agent.

13. The computing device of claim 8, wherein the computing device is further configured to auto-escalate the instance of telecommunications in response to detection of an anomalous agent behavior and/or an anomalous end user behavior.

14. The computing device of claim 8 further comprising the computing device being further configured to use a conversation aggregator to build a data analytics library, said building comprising storing end user information derived from the instance of telecommunications for later-in-time reference and comparison.

15. An article of manufacture comprising a non-transitory computer usable medium having computer readable program code embodied therein, the code when executed by one or more processors configuring a computer to execute a method for encouraging dialogue between and promoting transparency of said dialogue, a plurality of telecommunicators, the method comprising:
  receiving a request for a dialogue from one or more of the pluralities of telecommunicators, said request comprising a set of telecommunicator log-in credentials associated with each of the plurality of telecommunicators;
  identifying each telecommunicator by its set of log-in credentials;
  instantiating an instance of telecommunications between and among the plurality of telecommunicators, said instantiating being based, at least in part, on the identifying; and
  monitoring the instantiation.

16. The method of claim 15 further comprising receiving an utterance from one of the telecommunicators, and predicting a telecommunicator intent based, at least in part, on the utterance.

17. The method of claim 16, further comprising using the telecommunicator intent to prepare and transmit, in response to the telecommunicator intent, a text-based message to one or more of the other telecommunicators.

18. The method of claim 15 further comprising receiving an utterance from one of the pluralities of telecommunicators, and predicting a telecommunicator sentiment based, at least in part, on the utterance.

19. The method of claim 15, the monitoring comprising auto-escalating the instance of telecommunications in response to detection of an anomalous agent behavior and/or an anomalous end user behavior, said auto-escalating comprising transmitting an alert regarding the instance of telecommunications, to an entity associated with the anomalous agent behavior.

20. The method of claim 15 further comprising using a conversation aggregator to build a data analytics library, said building comprising storing a content of the instance of telecommunications for later in time reference and comparison.

* * * * *